(12) United States Patent
Chen et al.

(10) Patent No.: US 10,361,656 B1
(45) Date of Patent: Jul. 23, 2019

(54) METHOD FOR INSPECTING SOLAR CELL PACKAGES

(71) Applicant: INSTITUTE OF NUCLEAR ENERGY RESEARCH, ATOMIC ENERGY COUNCIL, EXECUTIVE YUAN, R.O.C., Taoyuan (TW)

(72) Inventors: Chun-Yi Chen, Taoyuan (TW); Yueh-Mu Lee, Taoyuan (TW); Hwen-Fen Hong, Taoyuan (TW)

(73) Assignee: Institute of Nuclear Energy Research, Atomic Energy Council, Executive Yuan, R.O.C., Taoyuan (TW)

( * ) Notice: Subject to any disclaimer, the term of this patent is extended or adjusted under 35 U.S.C. 154(b) by 66 days.

(21) Appl. No.: 15/865,439

(22) Filed: Jan. 9, 2018

(51) Int. Cl.
  *H02S 50/15* (2014.01)
  *G01B 11/26* (2006.01)
(52) U.S. Cl.
  CPC .............. *H02S 50/15* (2014.12); *G01B 11/26* (2013.01)

(58) Field of Classification Search
  CPC ........................................................ H02S 50/15
  See application file for complete search history.

(56) References Cited

U.S. PATENT DOCUMENTS

| 2009/0108857 A1* | 4/2009 | Kuo | H01L 31/0547 324/750.14 |
| 2009/0127448 A1* | 5/2009 | Fuyuki | H02S 50/10 250/238 |

* cited by examiner

*Primary Examiner* — Clayton E. LaBalle
*Assistant Examiner* — Jas A Sanghera
(74) *Attorney, Agent, or Firm* — Rosenberg, Klein & Lee

(57) ABSTRACT

The present invention uses a power supply to splay a forward bias to a concentrating solar cell. Then the solar cell will emit red light (electroluminescence). After passing the secondary optical device packaged on the solar cell, the red light will exhibit specific light distribution. According to the light distribution, the accuracy of the packaging location of the solar cell, the forming precision of the secondary optical device, and whether the optical devices are defective can be examined.

5 Claims, 5 Drawing Sheets

1

METHOD FOR INSPECTING SOLAR CELL PACKAGES

FIELD OF THE INVENTION

The present invention relates generally to a method for inspecting solar cell packages, which is used for examining the accuracy of packaging location of solar cells, the forming precision of secondary optical devices, and determining whether optical devices are defective.

BACKGROUND OF THE INVENTION

Presently, owing to the boost of oil price and the influence of the greenhouse effect, the green energy industry is valued highly and developing prosperously. In recent years, solar cell technologies progress continuously. Currently, silicon solar cells, thin-film solar cells, and concentrating solar cells are the mainstreams in the market. The concentrating solar cells adopt concentrating lenses to concentrate solar energy, in the hope of still gaining better optoelectronic conversion efficiency than traditional single-crystalline, polysilicon, and thin-film solar cells even the number of chips is reduced.

A general concentrating solar-cell module is mainly formed by concentrating lenses, solar cells, secondary optical devices, a circuit board, and a module frame. The combination of the solar cells, the circuit board, and the secondary optical devices is called a package board. Because the operating principle of a concentrating solar-cell module is to concentrate the sunlight to small-area solar cells for generating power, the accuracy of packaging location of solar cells and the precision of forming secondary optical devices are extremely crucial to the performance of power generation.

In general inspection, the optical visual inspection equipment is adopted for taking pictures before image analysis. Unfortunately, in addition to solar cells, there are secondary optical devices on the package board, making the images formed by the optical visual inspection equipment defocused or deformed. Consequently, it is difficult to perform inspection.

In addition, for the optical visual inspection equipment according to the prior art, digital images of the devices under inspection are taken using a camera disposed above before analysis. There can be flaws in the package boards of a concentrating solar cell, including horizontal shifts of solar cells and micro bubbles in the secondary optical devices located at different depths. Limited by the focusing depth of a camera lens, it is not possible to judge the above flaws in the same image. Furthermore, the refraction of light by the secondary optical devices deforms the images, making the inspection using the optical visual inspection equipment more difficult.

Accordingly, in the method for inspecting solar cell packages according to the prior art, there remains many faultful structures. After long-term researches and innovation, the present invention provides a method for inspecting solar cell packages. According to the method, a power supply applies a forward bias to solar cells, which then emit light owing to the electroluminescence phenomenon. The light passes through the secondary optical devices on the solar cells and is received by the photosensors above the solar cells. The photosensors move above the solar cells along various angles for acquiring the distribution of light intensity of the solar cells with respect to angles. Next, computer or analysis software is used for judging if the precision of the solar cell package and the secondary optical devices are defective.

SUMMARY

An objective of the present invention is to provide a forward bias to a solar cell to make the solar cell emit light due to electroluminescence. The light generated by the solar cell passes through the secondary optical device and is received by one or more photosensor. The photosensor measures the light intensity of the light emitted from the solar cell at various angles. In addition, the light intensity values are distributed symmetrically about 0 degree, which can be used for judging if the solar cell contains flaws and the locations of the flaws.

Another objective of the present invention is to provide a method for judging if the precision of secondary optical devices is insufficient. The light emitted from a solar cell passes through the secondary optical device and is received by one or more photosensor. The photosensor measures the light intensity of the light emitted from the solar cell at various angles. Once the maximum light intensity is reduced and the full width at half maximum of the distribution of light intensity is wider, it is judged that the precision of the secondary optical device is insufficient.

In order to achieve the above objectives, the present invention discloses a method for inspecting solar cell packages. The method comprises steps of applying a forward bias to a solar cell, which includes a secondary optical device; the solar cell emitting light via the secondary optical device; one or more photosensor disposed above the solar cell acquiring a plurality of light intensity values with respect to the solar cell at various angles; and the distribution of the plurality of light intensity values being symmetrical about 0 degree, which is defined when the photosensor is located above the solar cell.

According to an embodiment of the present invention, the secondary optical device includes bubbles. The photosensor acquires the plurality of light intensity values at various angles and the distribution of the plurality of light intensity values is asymmetrical about 0 degree.

According to an embodiment of the present invention, when the solar cell is shifted, the photosensor acquires the plurality of light intensity values at various angles and the distribution of the plurality of light intensity values is symmetrical about a nonzero angle.

DETAILED DESCRIPTION

In order to make the structure and characteristics as well as the effectiveness of the present invention to be further understood and recognized, the detailed description of the present invention is provided as follows along with embodiments and accompanying figures.

While inspecting concentrating solar-cell modules using the method according to the prior art, images are first taken using optical visual inspection equipment. Then the images are analyzed. Unfortunately, in addition to solar cells, there are secondary optical devices on the package board of the solar-cell module. The secondary optical devices will make the images taken by the optical visual inspection equipment defocused or deformed, leading to difficulties in inspection. Besides, a digital camera is adopted in the optical visual inspection equipment for shooting the device under inspection before analysis. Nonetheless, the flaws in some concentrating solar cells include horizontal shifts of the solar cells and micro bubbles in the secondary optical devices at different depths. Because the micro bubbles are located at different depths, the camera lens cannot focus, making it impossible to display the flaws (micro bubbles) in the same image. In addition, the refraction of light by the secondary optical devices deforms images, making the inspection for flaws in solar cells using the optical visual inspection equipment more difficult. Thereby, the present invention adopts a power supply to apply a forward bias to a concentrating solar cell for emitting light by electroluminescence. The light emitted from the solar cell passes through a secondary optical device. The a photosensor receives the light and analyzes the light intensity. By doing so, the light distribution of the secondary optical device will exhibit a symmetrical pattern. Thereby, the forming precision of the secondary optical device and whether the optical device is defective can be inspected.

Figure 1:
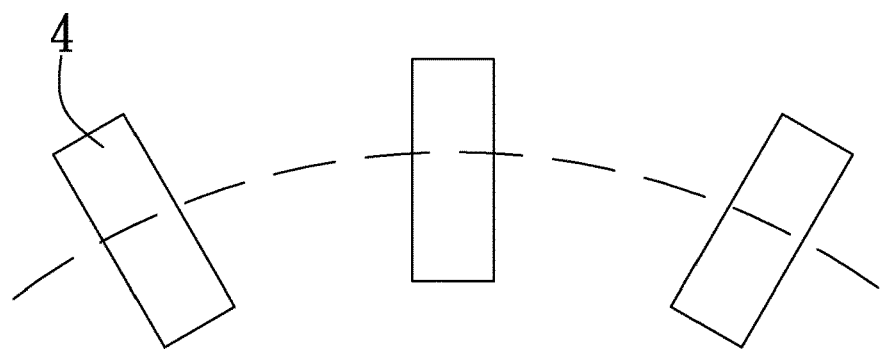
FIG. 1 shows a structure diagram according to a preferred embodiment of the present invention.
Figure 1:
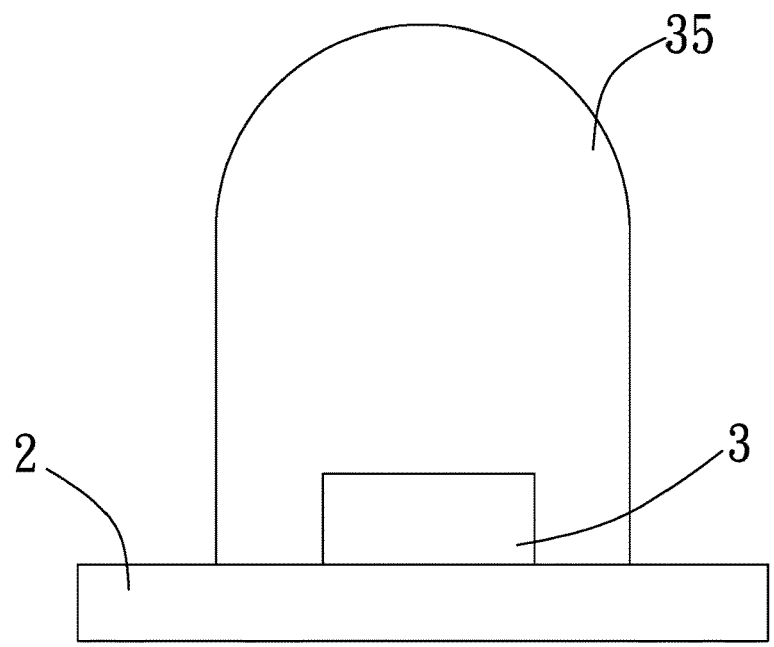

First, please refer to FIG. 1, which shows a structure diagram according to a preferred embodiment of the present invention. As shown in the figure, the structure 1 for inspecting solar cell packages comprises a circuit board 2, a solar cell 3, a secondary optical device 35, and one or more photosensor 4.

The solar cell 3 is disposed on the circuit board 2 and includes the secondary optical device 35 thereon. The material of the secondary optical device 35 can be transparent, such as glass, silica gel, or acrylic. The one or more photosensor 4 is disposed above the solar cell 3. The photosensor 4 acquires a plurality of light intensity values of the solar cell 3 at various angle with respect to the solar cell 3.

Figure 2:
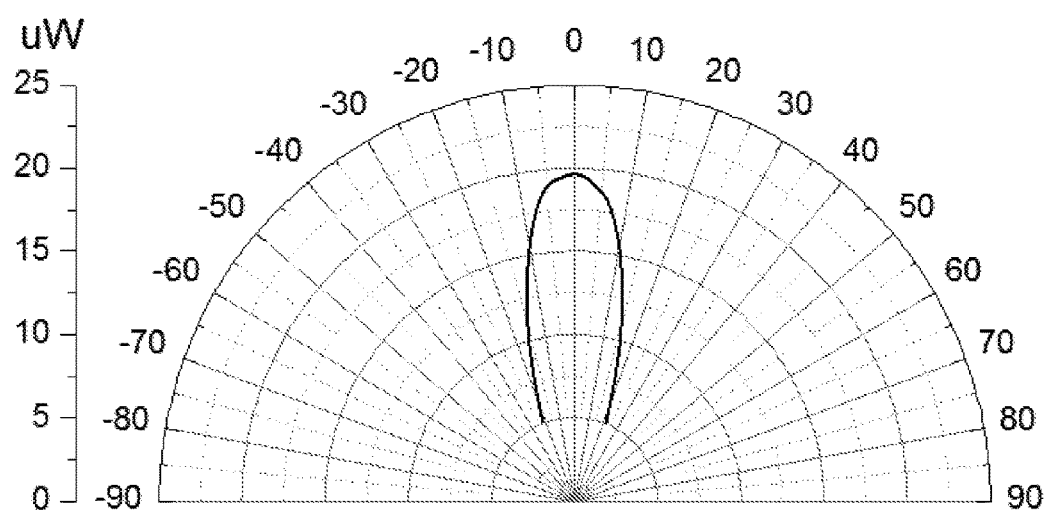
FIG. 2 shows a schematic diagram of light intensity values according to a preferred embodiment of the present invention.

Please continue to refer to FIG. 1 and FIG. 2. FIG. 2 shows a schematic diagram of light intensity values according to a preferred embodiment of the present invention.

The present invention provides a method for inspecting solar cell packages. The method adopts a power supply to apply a forward bias to the solar cell 3. The solar cell 3 includes the secondary optical device 35, which can be a Fresnel lens, a convex lens, a concave lens, or an optical device with free curve-surface design. Own to the forward bias provided by the power supply, the solar cell 3 can emit light due to electroluminescence. The light emitted from the solar cell 3 will pass through the secondary optical device 35. The one or more photosensor 4 is disposed above the solar cell 3. The photosensor 4 acquires the light at various angles with respect to the solar cell 3 and measures the light intensity values. When the photosensor 4 is disposed above the solar cell 3, the angle is defined as 0 degree and the distribution will be symmetrical about the 0 degree. The photosensor 4 acquires the plurality of light intensity values of the solar cell 3 at various angles. The plurality of light intensity values will be distributed symmetrically about 0 degree. If the distribution pattern of the plurality of light intensity values is symmetrical about 0 degree, then the forming precision of the solar cell 3 complies with the standard. In addition, there is no bubble formed in the secondary optical device. The light intensity values are distributed symmetrically.

Figure 3:
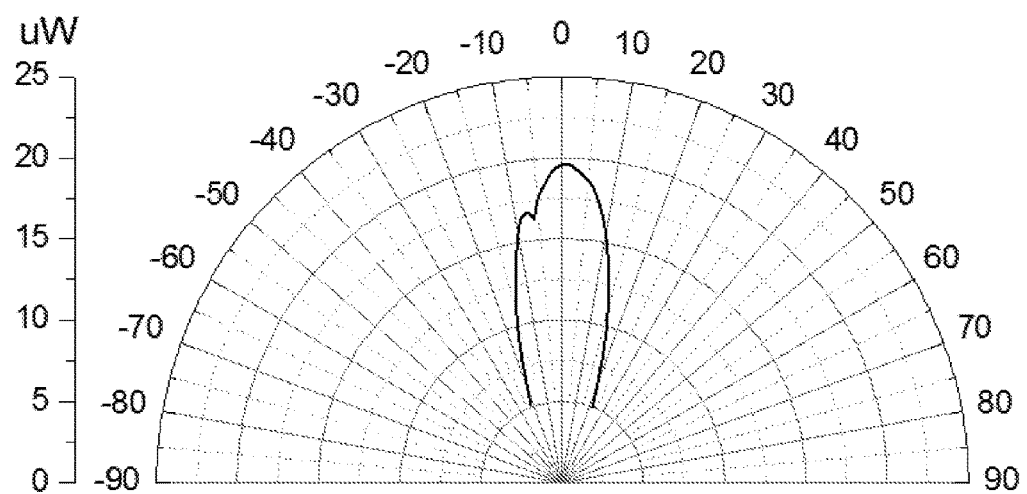
FIG. 3 shows a schematic diagram of light intensity values according to a preferred embodiment of the present invention.

Please refer to FIG. 3, which shows a schematic diagram of light intensity values according to a preferred embodiment of the present invention.

In FIG. 3, bubbles are formed in the secondary optical device 35 of the solar cell 3. The power supply provides a forward bias to the solar cell 3, which then emit light due to electroluminescence. After the light passes through the secondary optical device 35, it is received by the photosensor 4 at various angles. The light intensity values are analyzed using computer software. Next, the result is visualized. If bubbles are present in the secondary optical device 35, the plurality of light intensity values will be distributed about 0 degree asymmetrically. In addition, some recess will appear in the pattern because the presence of bubbles in the secondary optical device 35, making the distribution pattern asymmetrical.

Figure 4:
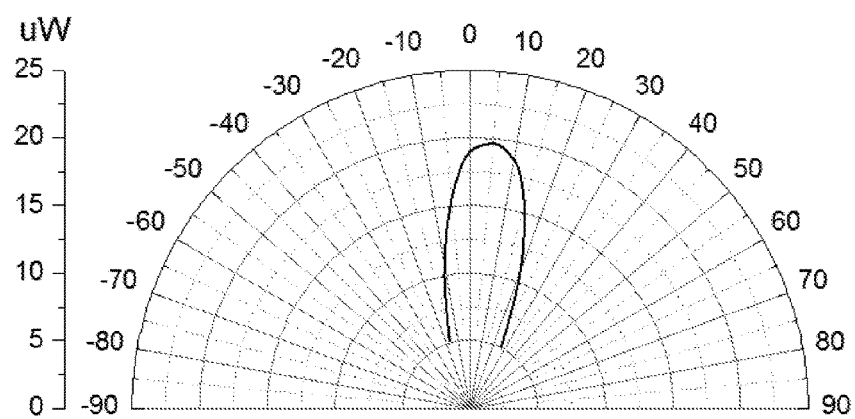
FIG. 4 shows a schematic diagram of light intensity values according to a preferred embodiment of the present invention.

Please continue to refer to FIG. 4, which shows a schematic diagram of light intensity values according to a preferred embodiment of the present invention.

FIG. 4 depicts a shift of the central position of the solar cell 3. When the power supply provides a forward bias to the solar cell 3, the solar cell 3 emits light due to electroluminescence. After the light passes through the secondary optical device 35, it is received by the photosensor 4 at various angles and the light intensity values are analyzed. When the solar cell 3 deviates from the central position, the photosensor 4 acquires the light from different angles and the distribution pattern is symmetrical about a nonzero angle. It means that the solar cell 3 is shifted from the central position; there is no bubble in the secondary optical device. Besides, the forming precision complies with the standard.

Figure 5:
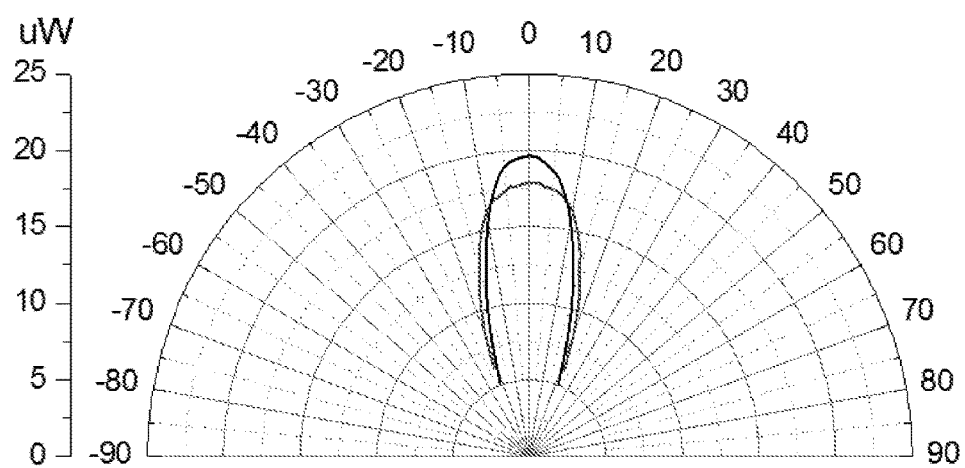
FIG. 5 shows a schematic diagram of light intensity values according to a preferred embodiment of the present invention.

Please refer to FIG. 5, which shows a schematic diagram of light intensity values according to a preferred embodiment of the present invention.

FIG. 5 shows the situation when the forming precision of the secondary optical device of the solar cell 3 is insufficient or when flaws are present. When the power supply provides a forward bias to the solar cell 3, the solar cell 3 emits light due to electroluminescence. After the light passes through the secondary optical device 35, it is received by the photosensor 4 at various angles and the light intensity values are analyzed. As the forming precision of the secondary optical device of the solar cell 3 is insufficient or when flaws are present the distribution pattern of the plurality of light intensity values is symmetrical about 0 degree. Nonetheless, the maximum light intensity is reduced and the full width at half maximum is wider. In addition, the light intensity values are lower than standard values. Then it is judged that the precision of the secondary optical device is insufficient. There is no bubble present in the secondary optical device and the location of the solar cell 3 is at the center.

To sum up, in the method for inspecting solar cell packages, a forward bias is applied to the solar cell 3 to make it emit light by electroluminescence. The photosensor 4 is disposed above the solar cell 3 and senses a plurality of light intensity values of the solar cell 3 at various angles to form the distribution of light intensity values. By using the method according to the present invention, the packaging accuracy of the solar cell 3, the forming precision of the secondary optical device, and whether the optical devices of the solar cell 3 are defective can be inspected.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

What is claimed is:

1. A method for inspecting solar cell packages, comprising steps of:
    applying a forward bias to a solar cell, said solar cell including a secondary optical device;
    said solar cell emitting light via said secondary optical device; and
    one or more photosensor disposed above said solar cell acquiring a plurality of light intensity values of said solar cell at various angles, and judging if the distribution of said plurality of light intensity values being symmetrical about 0 degree, which is defined as when said one or more photosensor is located above said solar cell.

2. The method for inspecting solar cell packages of claim 1, wherein when said secondary optical device includes bubbles, the distribution of said plurality of light intensity values is asymmetrical about 0 degree.

3. The method for inspecting solar cell packages of claim 1, wherein when said solar cell is shifted, the distribution of said plurality of light intensity values is symmetrical about a nonzero angle.

4. A method for inspecting solar cell packages, comprising steps of:
    applying a forward bias to a solar cell, said solar cell including a secondary optical device;
    said solar cell emitting light via said secondary optical device;
    one or more photosensor disposed above said solar cell acquiring a plurality of light intensity values of said solar cell at various angles; and
    judging the full width at half maximum of the distribution of said plurality of light intensity values when 0 degree is defined as when said one or more photosensor is located above said solar cell.

5. The method for inspecting solar cell packages of claim 4, wherein when the maximum intensity of said plurality of light intensity values is reduced and the full width at half maximum of the distribution of said plurality of light intensity values is wider, it is judged that the precision of said secondary optical device of said solar cell is insufficient.

* * * * *